Patented Nov. 9, 1937

2,098,448

UNITED STATES PATENT OFFICE 2,098,448

COMPLEX COMPOUNDS OF CINCHOPHEN AND ITS DERIVATIVES

Fritz W. Bramigk, Detroit, Mich.

No Drawing. Application February 2, 1935, Serial No. 4,717

12 Claims. (Cl. 260—39)

The present invention relates to a process of producing water soluble molecular compounds of hexamethylene tetramine, phenyl-quinoline carboxylic acid compounds, and pyrazolone compounds, particularly alkylated pyrazolones and alkylated amino-pyrazolones.

It has been found that new compounds of valuable physical and therapeutical properties may be produced by reacting together under suitable conditions hexamethylene tetramine, a phenyl-quinoline carboxylic acid compound, such as the calcium salt of 2-phenyl-quinoline-4-carboxylic acid, and a pyrazolone compound, such as 1-phenyl-2.3-dimethyl-4-dimethylamino - 5 - pyrazolone.

The new compounds thus produced differ very decidedly in their properties from the initial substances from which they are made.

For example, the calcium salt of 2-phenyl-quinoline-4-carboxylic acid, exists in the form of colorless crystals, needles and columns, insoluble in water and melting, if at all, above 260° C., at which temperature the substance begins to char; hexamethylene tetramine forms colorless columnar crystals readily soluble in water to the extent of 1 gram in 1.5 grams of water at 25° C., forming a typical crystalloid solution. It does not melt, but sublimes at 263° C. with partial decomposition; and the 1-phenyl-2.3-dimethyl-4-dimethyl-amino- 5-pyrazolone crystallizes in colorless shining leaves, readily soluble in water to a typically crystalloid solution, and melts at 108° C.

The compound formed from one molecule of the phenyl-quinoline carboxylic acid compound, two molecules of hexamethylene tetramine and two molecules of the pyrazolone compound forms an amorphous, almost colorless, slightly yellow powder, having a melting point of 82° C. and a maximum solubility in water of about 1.5 grams in 100 cubic centimeters of water at 25° C. The solution in water is typically colloidal rather than crystalloidal, producing foam when shaken and showing the Tyndall effect. Only upon prolonged treatment with boiling water do the new compounds hydrolyze, precipitating the phenyl-quinoline carboxylic acid compound in its original insoluble form, the pyrazolone compound and the hexamethylene tetramine going into solution, while the latter is split up into ammonia and formaldehyde.

The new compounds may advantageously be produced by heating together the phenyl-quinoline carboxylic acid compound, the hexamethylene tetramine and the pyrazolone compound in substantially molecular or polymolecular proportions.

For example: 218 grams of hexamethylene tetramine, 360 grams of 1-phenyl-2.3-dimethyl-4-dimethylamino-5-pyrazolone and 422 grams of the calcium salt of 2-phenyl-quinoline-4-carboxylic acid are pulverized and thoroughly mixed. The mixture is heated slowly up to 120-125° C. and kept at this temperature, preferably with agitation until a clear melt is formed. The melt is then allowed to cool and is pulverized in the usual manner. The cooled melt is a brittle glassy mass and when pulverized forms an amorphous, slightly yellow powder, melting at 82° C. and soluble at the rate of 1.5 grams in 100 cubic centimeters of water at 25° C.

It has been found to be advantageous for many purposes to mix the powdered compound with, for example, an equal weight of gelatin. This tends to prevent sticking or lumping of the product at high temperatures and in hot climates. It also stabilizes the solution of the compound in water so that hydrolysis is very much slower, and for internal administration the presence of the gelatin is not only harmless but may even be helpful because of its diluent effect.

In general the compounds of the invention comprise at least one molecule of hexamethylene tetramine and at least one molecule of a pyrazolone compound to each molecule of phenyl-quinoline carboxylic acid compound.

The term phenyl-quinoline carboxylic acid compound in the specification and claims includes salts, for example, alkali and alkali earth metal salts, and the esters of phenyl-quinoline carboxylic acid and of homologues and derivatives thereof, for example, the ethyl ester of 6-methyl-2-phenyl-quinoline-4-carboxylic acid. As in the case of the salts, the ethyl ester is contained in the proportion of one molecule thereof to one or more molecules each of hexamethylene tetramine and 1-phenyl-2.3-dimethyl-5-pyrazolone, or their equivalents mentioned herein.

The term pyrazolone includes 1-phenyl-2.3-dimethyl-5-pyrazolone and homologues and derivatives thereof.

With respect to their physical and therapeutical properties, the products of this invention may be compared with cinchophen which they are intended to replace. These products are prescribed for muscular and rheumatic pains, principally, and also for arthritis, influenza, neuritis, colds and the like. The calcium salt prepared according to the invention may be taken in capsule or tablet form, preferably the former, four grains to a capsule or tablet taken three times daily after meals. It is water soluble and therefore more readily assimilated than cinchophen. It does not have the irritating effect of cinchophen and is twice as effective as cinchophen for uric acid elimination. Therefore, it may be prescribed in smaller doses.

Further, this calcium salt is considerably less poisonous than ordinary cinchophen. Its toxicity is two to two and one-half (2 to 2½) grams per kilogram of body weight when taken by mouth and one-half to one (½ to 1) gram per kilogram of body weight when taken hypodermically. The toxicity of ordinary cinchophen is much lower, that is, a smaller amount of cinchophen will produce a given toxic effect on the experimental animal.

The sodium salt prepared according to the invention has similar properties and characteristics and is preferably used in the form of an ointment for muscular and rheumatic pains and the like.

I claim:

1. A complex compound resulting from the interaction of one molecule of a phenyl quinoline carboxylic acid compound selected from the group consisting of neocinchophen, cinchophen, and the alkali-forming metal salts of cinchophen, with at least one molecule of hexamethylene tetramine and at least one molecule of a pyrazolone compound selected from the group consisting of 1-phenyl-2.3-dimethyl-5-pyrazolone and 1-phenyl-2.3-dimethyl-4-dimethylamino-5 pyrazolone.

2. A complex compound resulting from the interaction of one molecule of phenyl quinoline carboxylic acid compound selected from the group consisting of neocinchophen, cinchophen, and the alkali-forming metal salts of cinchophen, with two molecules of hexamethylene tetramine and two molecules of a pyrazolone compound selected from the group consisting of 1-phenyl-2.3-dimethyl-5-pyrazolone and 1-phenyl-2.3-dimethyl-4-dimethylamino-5 pyrazolone.

3. A complex compound resulting from the interaction of one molecule of the calcium salt of 2-phenyl-quinoline-4-carboxylic acid with at least one molecule of hexamethylene tetramine and at least one molecule of 1-phenyl-2.3-dimethyl-4-dimethylamino-5-pyrazolone.

4. A complex compound resulting from the interaction of one molecule of the calcium salt of 2-phenyl-quinoline-4-carboxylic acid with two molecules of hexamethylene tetramine and two molecules of 1-phenyl-2.3-dimethyl-4-dimethylamino-5-pyrazolone.

5. A complex compound resulting from the interaction of one molecule of the ethyl ester of 6-methyl-2-phenyl-quinoline-4-carboxylic acid with at least one molecule of hexamethylene tetramine and at least one molecule of 1-phenyl-2.3-dimethyl-5-pyrazolone.

6. A complex compound resulting from the interaction of one molecule of the ethyl ester of 6-methyl-2-phenyl-quinoline-4-carboxylic acid with two molecules of hexamethylene tetramine and two molecules of 1-phenyl-2.3-dimethyl-5-pyrazolone.

7. A method of producing new complex compounds which comprises heating together one molecule of a phenyl quinoline carboxylic acid compound selected from the group consisting of neo-cinchophen, cinchophen, and the alkali-forming metal salts of cinchophen, with at least one molecule of hexamethylene tetramine and at least one molecule of a pyrazolone compound selected from the group consisting of 1-phenyl-2.3-dimethyl-5-pyrazolone and 1-phenyl-2.3-dimethyl-4-dimethylamino-5 pyrazolone until a clear melt is obtained.

8. A method of producing new complex compounds which comprises heating together one molecule of a phenyl quinoline carboxylic acid compound selected from the group consisting of neo-cinchophen, cinchophen, and the alkali-forming metal salts of cinchophen, with two molecules of hexamethylene tetramine and two molecules of a pyrazolone compound selected from the group consisting of 1-phenyl-2.3-dimethyl-5-pyrazolone and 1-phenyl-2.3-dimethyl-4-dimethylamino-5 pyrazolone until a clear melt is obtained.

9. A method of producing new complex compounds which comprises heating together one molecule of the calcium salt of 2-phenyl-quinoline-4-carboxylic acid with at least one molecule of hexamethylene tetramine and at least one molecule of 1-phenyl-2.3-dimethyl-4-dimethylamino-5-pyrazolone until a clear melt is obtained.

10. A method of producing new complex compounds which comprises heating together one molecule of the calcium salt of 2-phenyl-quinoline-4-carboxylic acid with two molecules of hexamethylene tetramine and two molecules of 1-phenyl-2.3-dimethyl-4-dimethylamino-5-pyrazolone until a clear melt is obtained.

11. A method of producing new complex compounds which comprises heating together one molecule of the ethyl ester of 6-methyl-2-phenyl-quinoline-4-carboxylic acid with at least one molecule of hexamethylene tetramine and at least one molecule of 1-phenyl-2.3-dimethyl-5-pyrazolone until a clear melt is obtained.

12. A method of producing new complex compounds which comprises heating together one molecule of the ethyl ester of 6-methyl-2-phenyl-quinoline-4-carboxylic acid with two molecules of hexamethylene tetramine and two molecules of 1-phenyl-2.3-dimethyl-5-pyrazolone until a clear melt is obtained.

FRITZ W. BRAMIGK.